US008130978B2

(12) United States Patent
Sun

(10) Patent No.: US 8,130,978 B2
(45) Date of Patent: Mar. 6, 2012

(54) DYNAMIC SWITCHING OF MICROPHONE INPUTS FOR IDENTIFICATION OF A DIRECTION OF A SOURCE OF SPEECH SOUNDS

(75) Inventor: Xinding Sun, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 718 days.

(21) Appl. No.: 12/251,525

(22) Filed: Oct. 15, 2008

(65) Prior Publication Data

US 2010/0092007 A1 Apr. 15, 2010

(51) Int. Cl.
*H04R 3/00* (2006.01)
(52) U.S. Cl. .............. 381/92; 381/58; 381/59; 381/71.1
(58) Field of Classification Search ................ 381/92, 381/58, 59, 71.1
See application file for complete search history.

(56) References Cited

U.S. PATENT DOCUMENTS

| | | | |
|---|---|---|---|
| 7,127,071 B2 | 10/2006 | Rui | 381/92 |
| 7,142,677 B2 | 11/2006 | Gonopolskiy | 381/92 |
| 2004/0263636 A1 | 12/2004 | Cutler | 348/211.12 |
| 2005/0091050 A1 | 4/2005 | Surendran | 704/226 |
| 2005/0195988 A1 | 9/2005 | Tashev | 381/92 |

FOREIGN PATENT DOCUMENTS

WO WO 2007125449 A1 11/2007

OTHER PUBLICATIONS

Abu-El-Quran, A.R., et al., "Security-Monitoring Using Microphone Arrays and Audio Classification," May 17-19, 2005, Instrumentation and Measurement Technology Conference—IEEE, http://ieeexplore.ieee.org/iel5/10678/33711/01604323.pd?isnumber=33711&arnumber=1604323, 5 pages.
Rui, Yong, et al., "Sound Source Localization for Circular Arrays of Directional Microphones," 2005, Microsoft Corporation—IEEE, http://ieeexplore.ieee.org/iel5/9711/30652/01415654.pdf?isnumber=30652&arnumber=1415654, 4 pages.
Zhang, Cha, et al., "Maximum Likelihood Sound Source Localization for Multiple Directional Microphones," 2007, Microsoft Research—IEEE, http://ami2.dit.unitn.it/ICASSP07/pdfs/0100125.pdf, 4 pages.

*Primary Examiner* — Long Pham
(74) *Attorney, Agent, or Firm* — Merchant & Gould

(57) ABSTRACT

This disclosure describes techniques of automatically identifying a direction of a speech source relative to an array of directional microphones using audio streams from some or all of the directional microphones. Whether the direction of the speech source is identified using audio streams from some of the directional microphones or from all of the directional microphones depends on whether using audio streams from a subgroup of the directional microphones or using audio streams from all of the directional microphones is more likely to correctly identify the direction of the speech source. Switching between using audio streams from some of the directional microphones and using audio streams from all of the directional microphones may occur automatically to best identify the direction of the speech source. A display screen at a remote venue may then display images having angles of view that are centered generally in the direction of the speech source.

13 Claims, 5 Drawing Sheets

DYNAMIC SWITCHING OF MICROPHONE INPUTS FOR IDENTIFICATION OF A DIRECTION OF A SOURCE OF SPEECH SOUNDS

BACKGROUND

Videoconferencing is a technology that allows people in two or more locations to communicate via simultaneous two-way video and audio transmissions. Videoconferencing has become an important way to conduct business because it allows people to see and hear what is occurring at a remote location. Being able to see what is occurring at remote locations may help a person to understand what is occurring better than simply being able to hear what is occurring at the remote locations.

In many circumstances, a group of people may gather together in a central venue for a meeting. For instance, the group of people may gather together in a single conference room for the meeting. A videoconferencing system installed in the central venue may capture images and sound in the central venue and transmit the images and sound in real time to videoconferencing systems at one or more remote venues. Likewise, the videoconferencing systems at the remote venues may capture images and sound in the remote venues and transmit the images and sound in real time to the central venue and the other remote venues.

In these circumstances, it may be difficult for an individual at a remote venue to determine which of the people at the central venue is speaking. This may be because a camera at the central venue may need to have a broad enough viewing angle so that all participants in the central venue are visible. Several approaches may be taken to overcome this issue. For instance, if the videoconferencing system has a single camera, the videoconferencing system may attempt to automatically identify a person at the central venue who is speaking, automatically direct the camera in the direction of the identified person, and to transmit images captured by the camera to a remote venue. In another instance, if the videoconferencing system has multiple cameras, the videoconferencing system may automatically identify a person at the central venue who is speaking and automatically transmit to a remote venue images having the angle of view centered in the general direction of the identified person. In this way, a participant at the remote venue sees video of the person speaking, as opposed to seeing video of the entire conference room.

SUMMARY

This disclosure describes techniques of automatically identifying a direction of a speech source relative to an array of directional microphones using audio streams from some or all of the directional microphones. Whether the direction of the speech source is identified using audio streams from some of the directional microphones or from all of the directional microphones depends on whether using audio streams from a subgroup of the directional microphones or using audio streams from all of the directional microphones is more likely to correctly identify the direction of the speech source. Switching between using audio streams from some of the directional microphones and using audio streams from all of the directional microphones may occur automatically to best identify the direction of the speech source. A display screen at a remote venue may then display images having angles of view that are centered generally in the direction of the speech source.

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

DETAILED DESCRIPTION

As briefly described above, this disclosure is directed to techniques of automatically identifying a direction of a source of speech sounds (i.e., a speech source) relative to an array of directional microphones located at a first venue. As described herein, a computing device automatically identifies the direction of the speech source using audio streams from the directional microphones in a first subgroup of the directional microphones when it is more likely that the direction of the speech source will be correctly identified using the audio streams from the first subgroup of the directional microphones than the audio streams from any other subgroup of the directional microphones and when it is more likely that the direction of the speech source will be correctly identified using the audio streams from the first subgroup of the directional microphones than the audio streams from all of the directional microphones. Furthermore, the computing device automatically identifies the direction of the speech source using the audio streams from all of the directional microphones when it is more likely that the direction of the speech source will be correctly identified using the audio streams from all of the directional microphones than the audio streams from any subgroup of the directional microphones. The computing device may then cause a display screen at a second venue to display images from a camera that faces in the direction of speech source. In this way, a participant at the second venue may see images of a person at the first venue who is speaking.

In the following detailed description, references are made to the accompanying drawings that form a part hereof, and in which are shown by way of illustrations specific examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
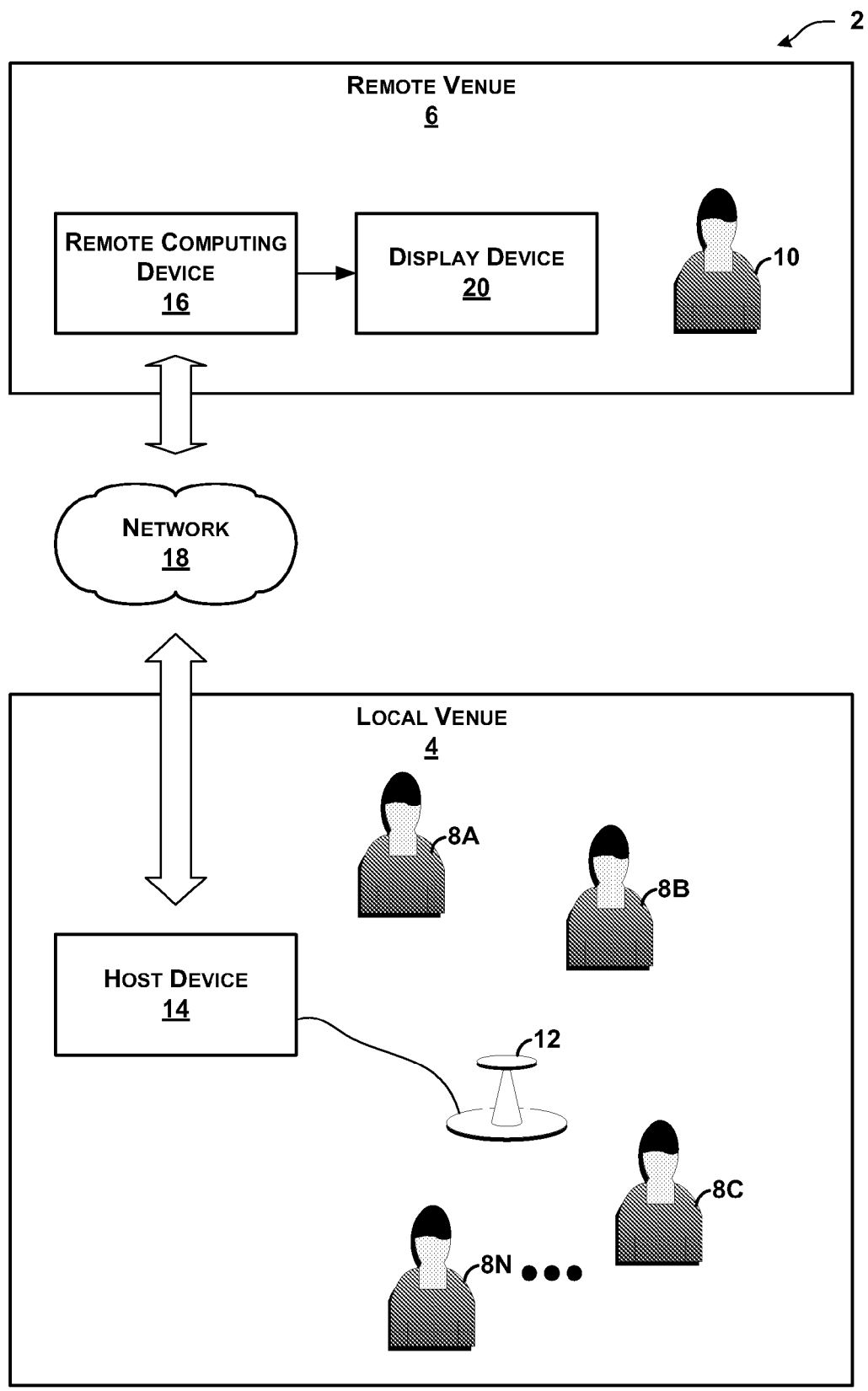
FIG. 1 is a block diagram illustrating an example system that implements the techniques of this disclosure.

FIG. 1 is a block diagram that illustrates an example system 2 that implements the techniques of this disclosure. As illustrated in the example of FIG. 1, system 2 includes a local venue 4 and a remote venue 6. Local venue 4 and remote venue 6 may be a variety of different types of venues. For example, local venue 4 and/or remote venue 6 may be offices, conference rooms, home offices, hotel rooms, internet cafes, coffee shops, outdoor locations, vehicles, or other types of venues. Although not illustrated in the example of FIG. 1, system 2 may include additional venues.

In the example of FIG. 1, a plurality of users 8A-8N (collectively, "users 8") are located at local venue 4. A user 10 is located at remote venue 6. It should be understood that, in addition to user 10, there may be a plurality of users at remote venue 6. Furthermore, it should be understood that users 8 may include any number of users.

A videoconferencing device 12 is located at local venue 4. Videoconferencing device 12 may be positioned at a variety of places within local venue 4. For example, videoconferencing device 12 may be positioned on a conference table. In this example, users 8 may be seated around the conference table. In another example, videoconferencing device 12 may be attached to the ceiling of local venue 4.

As described in detail below, videoconferencing device 12 includes an array of directional microphones. Each of the directional microphones is configured to capture sound from a particular direction.

A set of cameras may be located in local venue 4. In the example of FIG. 1, the set of cameras are included within videoconferencing device 12. The cameras may be positioned on videoconferencing device 12 such that the cameras are able to capture images in a range of 360-degrees. In other examples, one or more cameras may be positioned at fixed locations in local venue 4. In such examples, the cameras may be at fixed angles or may be able to tilt, pan, and/or zoom.

In the example of FIG. 1, videoconferencing device 12 communicates with a host device 14. Videoconferencing device 12 may communicate with host device 14 in a variety of ways. In the example of FIG. 1, videoconferencing device 12 communicates with host device 14 via a cable. For instance, the cable may be a Universal Serial Bus (USB) cable, a serial bus cable, a FireWire cable, an Ethernet cable, or another type of external device connection cable. In other examples, videoconferencing device 12 and host device 14 may communicate wirelessly using a wireless communication protocol such as WiFi, Bluetooth, WiMax, or another wireless communication protocol.

Host device 14 may be a wide variety of different types of computing devices and may be located at a variety of places. For example, host device 14 may be a personal computer, a laptop computer, a standalone server, a server blade, a mainframe computer, an intermediate network device, a handheld computing device, a device integrated into a vehicle, or another type of computing device. Furthermore, host device 14 may be divided into two or more physical units. Although host device 14 is illustrated in the example of FIG. 1 as being located within local venue 4, host device 14 may be located outside local venue 4. For instance, host device 14 may be located at a data center, a server room at a local office, or elsewhere. When host device 14 is located outside local venue 4, videoconferencing device 12 may communicate with host device 14 via an electronic communications network, such as a local area network, a wide area network, the Internet, or another type of electronic communications network.

Host device 14 hosts videoconferences. In other words, host device 14 acts to facilitate videoconferences. For example, users may use their respective computing devices to interact with host device 14 to join a videoconference. In this example, after a user has joined a videoconference, host device 14 may forward the audio/video data of the videoconference to the user's computing device.

In the example of FIG. 1, host device 14 communicates with a remote computing device 16 at remote venue 6 via an electronic communications network 18. Remote client device 16 may be a wide variety of different types of computing devices. For example, remote client device 16 may be a personal computer, a laptop computer, a television set top box, a special-purpose videoconferencing device, a mobile telephone, a device integrated into a vehicle, or another type of device. Network 18 may be a wide variety of electronic communications networks including, but not limited to, local area networks, wide-area networks, the Internet, an intranet, an extranet, or another type of electronic communications network.

A display device 20 is connected to remote computing device 16. Display device 20 may be a variety of different types of display devices. For example, display device 20 may be a television, a video projector, a liquid crystal display (LCD) screen, a plasma screen, a light-emitting diode (LED) array, a cathode ray tube (CRT) monitor, a rear-projection screen, or another type of display device.

Host device 14 receives a set of audio streams from the directional microphones in videoconferencing device 12. Each of the audio streams is from a different one of the directional microphones in videoconferencing device 12. An audio stream from a directional microphone is a representation of sound being received by the directional microphone. As described in detail below, host device 14 automatically identifies a direction of a speech source using the audio streams from the directional microphones in a first subgroup of the directional microphones when it is more likely that the direction of the source of the speech sounds will be correctly identified using the audio streams from the first subgroup of the directional microphones than the audio streams from any other subgroup of the directional microphones and when it is more likely that the direction of the source of the speech sounds will be correctly identified using the audio streams from the first subgroup of the directional microphones than the audio streams from all of the directional microphones. In the example of FIG. 1, one of users 8 may be the speech source. Furthermore, host device 14 automatically identifies the direction of the speech source using the audio streams from all of the directional microphones when it is more likely that the direction of the speech source will be correctly identified using the audio streams from all of the directional microphones than the audio streams from any subgroup of the directional microphones.

After host device 14 identifies the direction of the speech source, host device 14 may identify one or more cameras at local venue 4 that are pointed in the general direction of the speech source. In a first example, if user 8A is the speech source, host device 14 identifies a camera at local venue 4 that is pointed in the general direction of user 8A. In a second example, the direction of the speech source is not aligned with the center of the angle of view of a single camera at local venue 4, but is within the angles of view of two cameras at local venue 4. In this second example, videoconferencing device 12 or host device 14 may digitally stitch together images from the two or more cameras to produce images that have angles of view that have centers that are aligned with the direction of the speech source. In this second example, a person who is the speech source may be at the centers of the resulting images. In a third example, host device 14 may automatically identify a camera at local venue 4 that is capable of being pointed in the general direction of the speech source and pan and/or tilt the identified camera such that the identified camera is pointed in the general direction of the speech source.

Host device 14 may receive digital representations of images (i.e., digital video). As host device 14 receives the digital representations of the images, host device 14 transmits information via network 18 to remote computing device 16.

Remote computing device 16 uses this information to recreate the digital representations of the images. As remote computing device 16 recreates the digital representations of the images, remote computing device 16 sequentially displays the images on display device 20. In this way, host device 14 causes display device 20 to display the images. User 10 perceives the sequential display of the images on display device 20 as a live video feed.

It should be appreciated that FIG. 1 illustrates only one example implementation of system 2. Many other implementations of system 2 may exist. For example, in one implementation of system 2, host device 14 is physically integrated into videoconferencing device 12. In another example, host device 14 may be physically located at a data center and may host videoconferences for one or more organizations.

Figure 2:
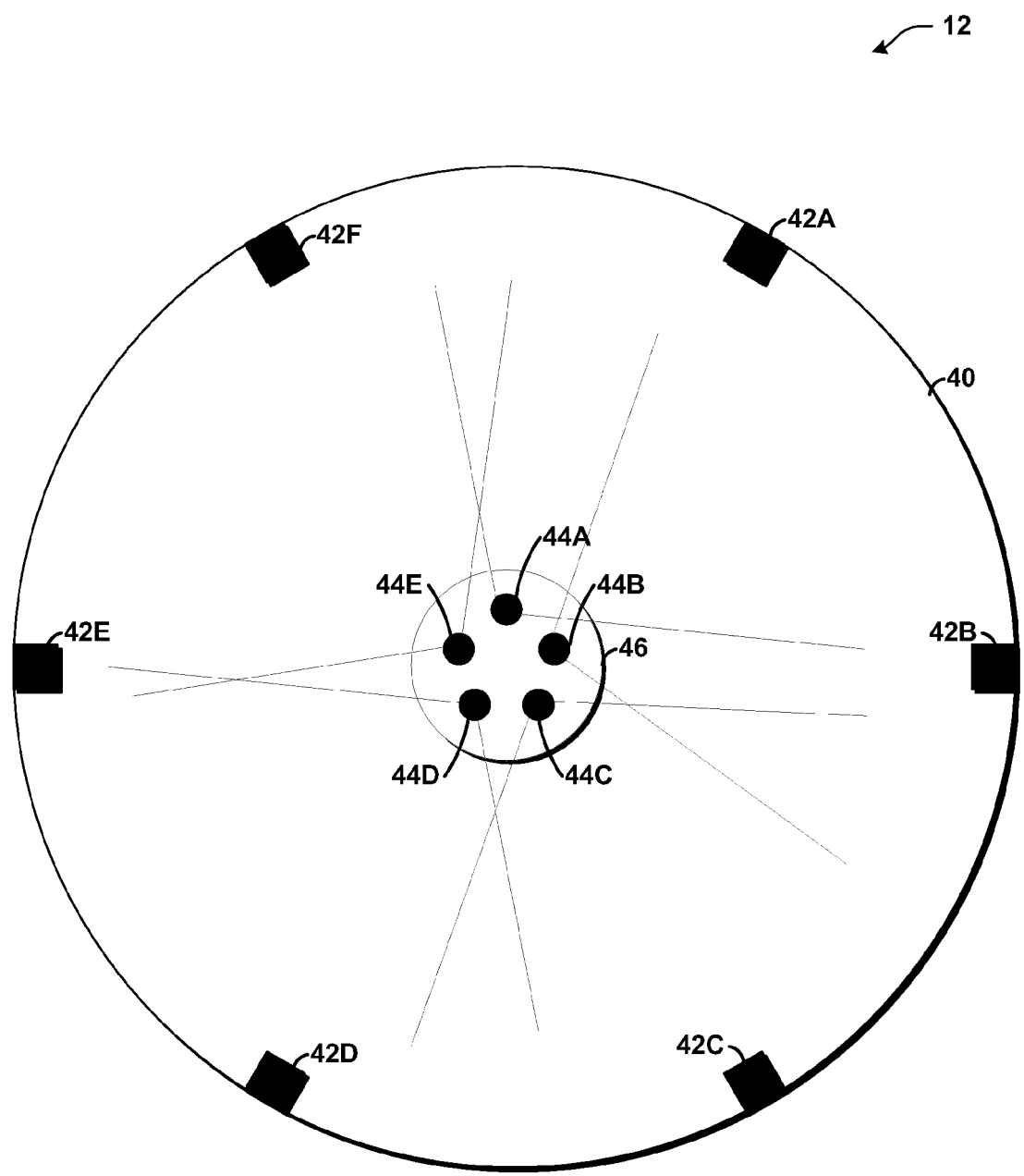
FIG. 2 illustrates a top view of an example videoconferencing device.

FIG. 2 illustrates a top view of an example implementation of videoconferencing device 12. As illustrated in the example of FIG. 2, videoconferencing device 12 includes a circular base 40. Base 40 includes an array of directional microphones 42A-42F (collectively, "directional microphones 42"). Each of directional microphones 42 is positioned at equal distances from each other along the outer edge of base 40. Each of directional microphones 42 is most sensitive to sound arriving in a direction that points radially inward from the directional microphone to the center of base 40. For example, directional microphone 42B is most sensitive to sound traveling straight from right to left.

Furthermore, as illustrated in the example of FIG. 2, videoconferencing device 12 includes a set of cameras 44A-44E (collectively, "cameras 44"). In the example of FIG. 2, cameras 44 are mounted on a platform 46 that extends above base 40. Each of cameras 44 has a viewing angle that is illustrated in the example of FIG. 2 with dotted lines. The viewing angles of cameras 44 are such that when images from individual ones of cameras 44 are digitally stitched together, cameras 44 are able to capture images in all directions. Consequently, if videoconferencing device 12 is positioned at the middle of a conference table in local venue 4 and users 8 are seated around the conference table, cameras 44 would be able to capture images of all of users 8.

It should be understood that the example of FIG. 2 illustrates only one possible implementation of videoconferencing device 12. Many other implementations of videoconferencing device 12 are possible. Although the example of FIG. 2 illustrates videoconferencing device 12 as having six directional microphones, other suitable videoconferencing devices may include two or more directional microphones. For instance, one suitable videoconferencing device may have twelve directional microphones. Similarly, although the example of FIG. 2 illustrates videoconferencing device 12 as having five cameras, other suitable videoconferencing devices may include two or more cameras.

Figure 3:
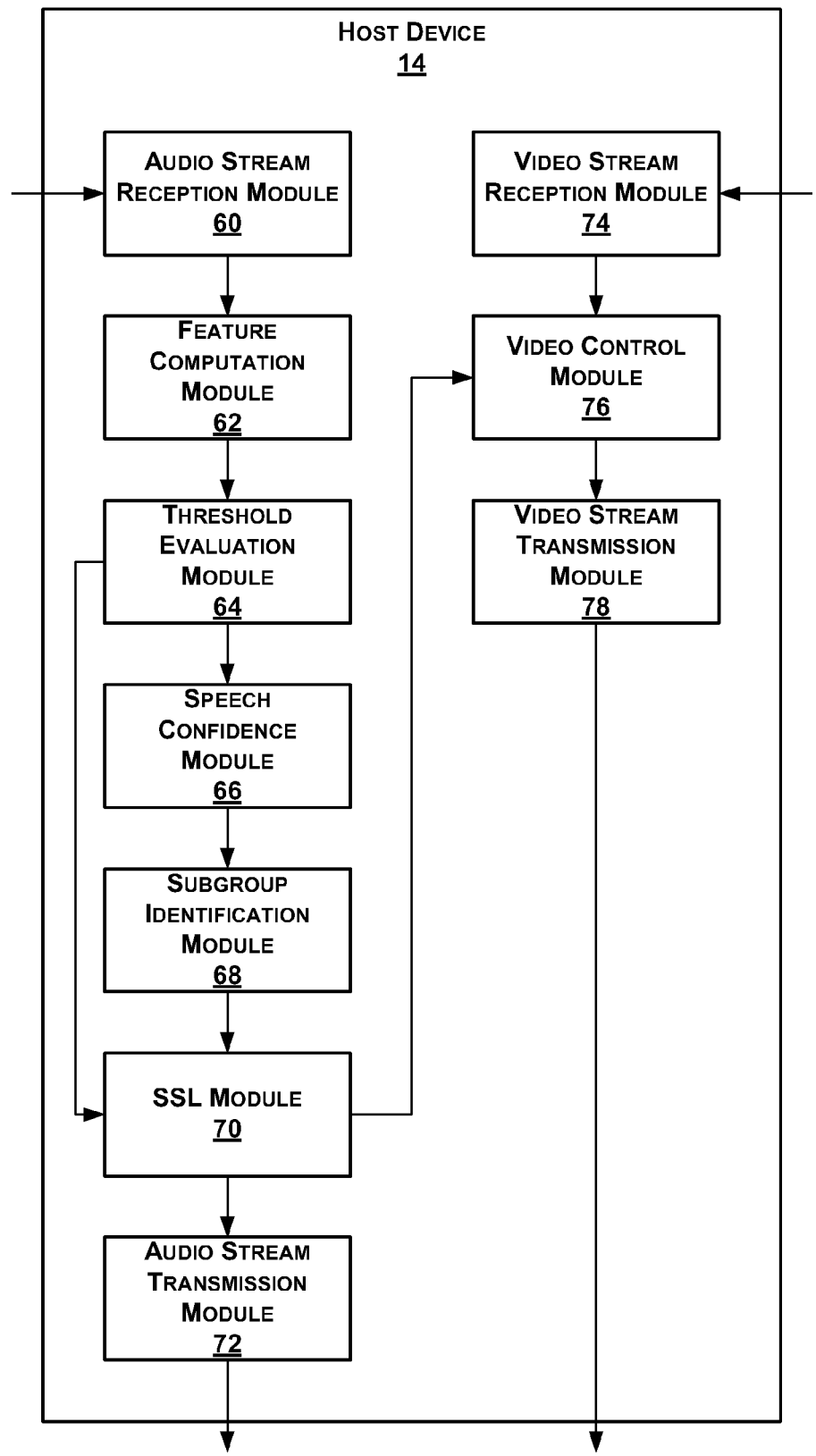
FIG. 3 is a block diagram illustrating example logical components of a host device.

FIG. 3 is a block diagram illustrating example logical components of host device 14. For purposes of explanation, the example of FIG. 3 is explained with continuing reference to FIG. 1 and FIG. 2. As illustrated in the example of FIG. 3, host device 14 logically comprises an audio stream reception module 60, a feature computation module 62, a threshold evaluation module 64, a speech confidence module 66, a subgroup identification module 68, a sound source location (SSL) module 70, an audio stream transmission module 72, a video stream reception module 74, a video control module 76, and a video stream transmission module 78. The functionality of each of these modules is explained below with reference to the example operation illustrated in FIG. 4.

It should be understood that the example of FIG. 3 illustrates only one example logical implementation of host device 14. In other logical implementations of host device 14, host device 14 may include more or fewer logical components. It should also be appreciated that the logical components illustrated in the example of FIG. 3 may be implemented as software instructions that cause host device 14 to perform the described functionality. Alternatively, some or all of the logical components illustrated in the example of FIG. 3 may be implemented as special purpose hardware.

Figure 4:
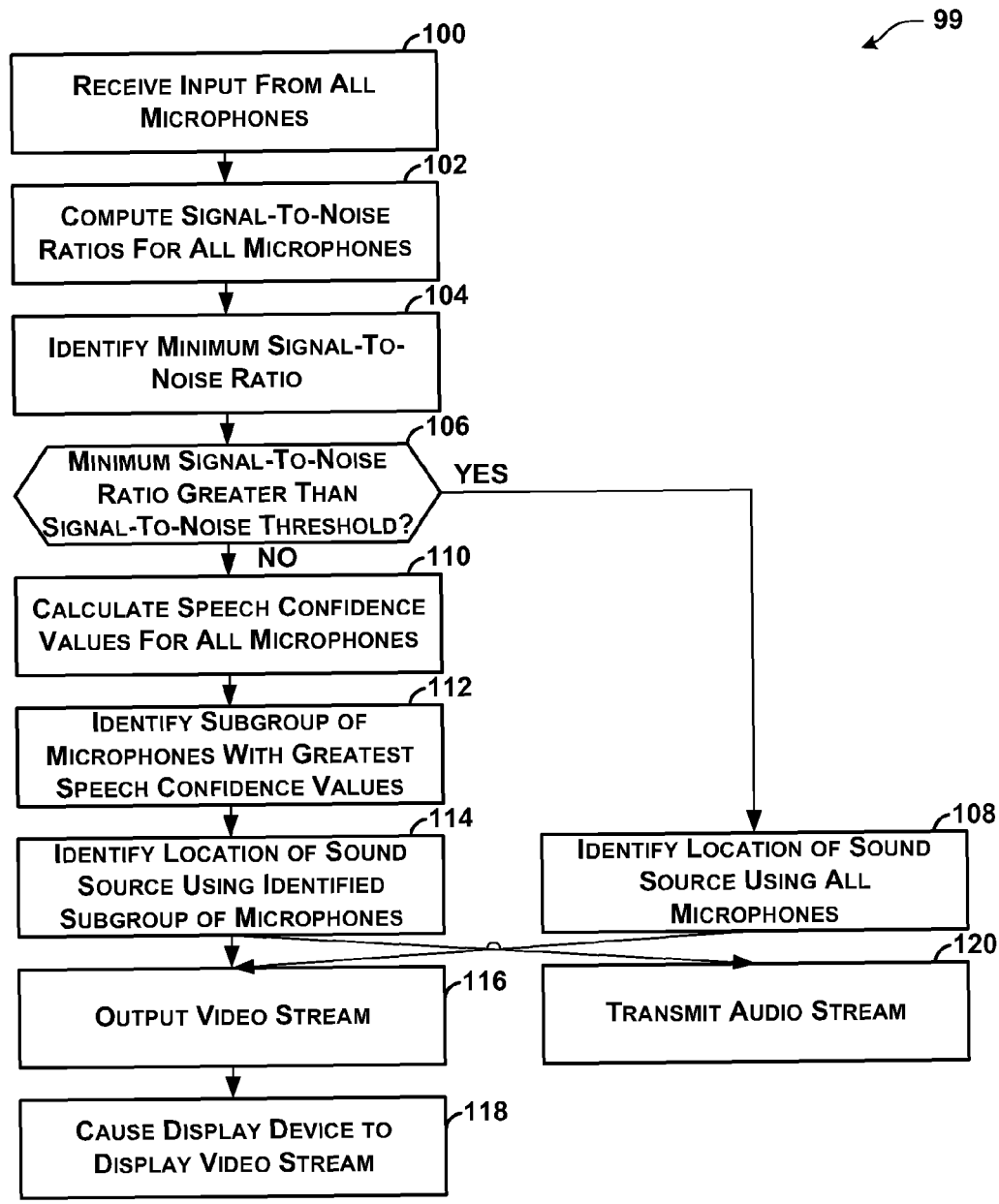
FIG. 4 is a flowchart illustrating an example operation of the host device.

FIG. 4 is a flowchart illustrating an example operation 99 of hosting device 14. In the example of FIG. 4, audio stream reception module 60 receives audio streams from directional microphones 42 (100). Audio stream reception module 60 may receive the audio streams in a variety of formats. For example, audio stream reception module 60 may receive the audio streams as uncompressed digital waveforms. In a second example, audio stream reception module 60 may receive the audio streams as analog waveforms. In a third example, audio stream reception module 60 may receive the audio streams as compressed digital waveforms. The audio streams may include speech sounds and stationary or non-stationary noises. Example noises may include the sound typing on a keyboard, the sound of a laptop fan, the noise of shuffling paper, and so on. The effect of non-stationary noises and stationary noises on speech source location may be minimized by configuring hosting device 14 in advance to recognize locations of stationary noises.

As audio stream module 60 receives the audio streams from directional microphones 42, feature computation module 62 calculates a feature value for each of directional microphones 42 (102). In one example implementation, the feature value for one of directional microphones 42 is the signal-to-noise ratio of the directional microphone. The signal-to-noise ratio for a directional microphone is the proportion of signal in an audio stream from the directional microphone as compared to the noise in the audio stream from the directional microphone. Feature computation module 62 may calculate the signal-to-noise ratio for an audio stream in a variety of ways. For instance, different implementations of feature computation module 62 may use different noise floor tracking methods or calculate the signal-to-noise ratios as averages over different periods of time. In other example implementations, the feature values for directional microphones 42 may be zero crossing rates, energy levels, band periodicity, pitch, linear predictive coding (LPC) distance, cepstral features and their extensions, and/or other factors.

After feature computation module 62 calculates a feature value for each of directional microphones 42, threshold evaluation module 64 identifies a minimum one of the calculated feature values (104). Threshold evaluation module 64 then determines whether the minimum one of the calculated feature values is greater than a threshold (106). For example, in implementations in which the feature values are signal-to-noise ratios, threshold evaluation module 64 determines whether the minimum one of the signal-to-noise ratios is greater than a signal-to-noise threshold. The signal-to-noise threshold may be manually set or automatically set using a training process that evaluates a collection of sample acoustic datasets.

If the minimum one of the calculated feature values is greater than the threshold ("YES" of 106), it is more likely that the direction of the speech source will be correctly identified using the audio streams from all of directional microphones 42. Consequently, if the minimum one of the feature values is greater than the threshold ("YES" of 106), SSL module 70 automatically identifies a direction of a speech source using the audio streams from all of the directional microphones (108).

SSL module 70 may use a variety of different algorithms to automatically identify the direction of the speech source. For example, SSL module 70 may use a steered-beam former based technique, a high-resolution spectral estimation based technique, a time delay of arrival (TDOA) based technique, a learning based technique, a maximum likelihood framework, or another technique to identify the direction of the speech source.

On the other hand, if the minimum one of the calculated feature values is not greater than the threshold ("NO" of 106), it is more likely that the direction of the source of the speech sounds will be correctly identified using the audio streams from a subgroup of the directional microphones than the audio streams from all of the directional microphones. Consequently, if the minimum one of the calculated feature values is not greater than the threshold ("NO" of 106), speech confidence module 66 calculates a speech confidence value for each of directional microphones 42 (110).

Speech confidence module 66 may calculate a speech confidence value for a directional microphone in a variety of ways. For example, speech confidence module 66 may calculate the speech confidence values for directional microphones 42 by automatically computing spectral entropies and signal-to-noise ratios for each of directional microphones 42. In one example implementation, the spectral entropy of one of directional microphones 42 may be calculated using the following equation:

$$H = -\sum_{i=1}^{N} x_i \log_2 x_i$$

where $$x_i = \frac{X_i}{\sum_{i=1}^{N} X_i}$$

for i=1 to N, H is the entropy, where $X_i$ represents the energy of the $i^{th}$ frequency component of the spectrum and $x_i$ is the probability mass function of the spectrum.

In the example implementation of speech confidence module 66 that uses spectral entropies of directional microphones 42, speech confidence module 66 may automatically calculate a speech confidence value for a directional microphone using the spectral entropy for the directional microphone and the signal-to-noise ratio for the directional microphone. For instance, speech confidence module 66 may use the following formula to calculate a speech confidence value of a directional microphone i:

$$S_i = \alpha*(\text{spectral entropy}_i) + \beta*(\text{signal-to-noise ratio}_i),$$

where $S_i$ is the speech confidence value for directional microphone i, $\alpha$ is a first weight factor, spectral entropy$_i$ is the spectral entropy for directional microphone i, $\beta$ is a second weight factor, and signal-to-noise ratio$_i$ is the signal-to-noise ratio for directional microphone i. In this instance, $\alpha$ and $\beta$ may be manually set or automatically set using a training process that determines $\alpha$ and $\beta$ using a set of previously collected acoustic datasets.

In other instances, speech confidence module 66 calculates the speech confidence values for directional microphones 42 using factors such as zero crossing rates, energy levels, band periodicity, pitch, linear predictive coding (LPC) distance, cepstral features and their extensions, and/or other factors.

After speech confidence module 66 calculates the speech confidence value for each of directional microphones 42, subgroup identification module 68 identifies a subgroup of directional microphones 42 that has the greatest combined speech confidence value (112). It is more likely that the correct direction of the speech source will be identified using the subgroup of directional microphones 42 that has the greatest combined speech confidence values than any other subgroup of directional microphones 42. In one example implementation, subgroup identification module 68 identifies the subgroup of directional microphones 42 that has the greatest combined speech confidence value by totaling the speech confidence values of the directional microphones in each of the subgroups of directional microphones 42.

The directional microphones in the subgroup of directional microphones 42 may be mutually adjacent. In the example of FIG. 2, there are six possible subgroups of three mutually adjacent directional microphones: {42A, 42B, 42C}, {42B, 42C, 42D}, {42C, 42D, 42E}, {42D, 42E, 42F}, {42E, 42F, 42A}, and {42F, 42A, 42B}. In other example implementations, each subgroup of directional microphones 42 may include different numbers of directional microphones (e.g., four directional microphones in a subgroup).

After subgroup identification module 68 identifies the subgroup of directional microphones 42, SSL module 70 exclusively uses the audio streams from the identified subgroup of directional microphones 42 to identify a direction of the speech source (114). In other words, SSL module 70 does not use the audio streams from ones of directional microphones 42 that are not in the identified subgroup to identify the direction of the speech source. SSL module 70 may use a same or a different algorithm to identify the direction of the speech source when SSL module 70 is identifying the direction of the speech sound using audio streams from the identified subgroup of directional microphones 42 and when SSL module 70 is identifying the direction of the speech source using audio streams from all of directional microphones 42.

After SSL module 70 identifies the direction of the speech source either at (108) or at (114), video control module 76 outputs a video stream that has an angle of view that is centered generally in the direction of the speech source (116). Video control module 76 may use the direction of the speech source identified by SSL module 70 along with other visual detection results, such as face detection, to further improve the identification of the direction of the speech source. To output the video stream, video control module 76 may generate the video stream by cropping and digitally stitching together two or more of the video streams received by video stream reception module 74. Video stream transmission module 78 then causes a display device to display the video stream output by video control module 76 (118). For example, video stream transmission module 78 may cause the display device to display the video stream output by video control module 76 by transmitting to remote computing device 16 the video stream output by video control module 76. In one example implementation, video stream transmission module 78 may transmit a second video stream that combines the video streams from all of cameras 44 so that the second video stream has a panoramic view of local venue 4.

As video control module 76 outputs the video stream, audio stream transmission module 72 transmits an audio stream (120). In one example configuration, the audio stream may include only the audio stream from the one of directional microphones 42 that is configured to be most sensitive to sounds arriving from the direction of the speech source. In a second example configuration, audio stream transmission module 72 transmits an audio stream that is a mixture of two or more of the audio streams from directional microphones 42. In this second example configuration, the audio streams may be automatically mixed such that the audio stream from the directional microphone that is configured to be most sensitive to sounds arriving from the direction of the speech source is more audible than the audio streams from other ones of directional microphones 42.

As video stream transmission module 78 and audio stream transmission module 72 are transmitting the video stream and the audio stream, video stream reception module 74 and audio stream reception module 60 continue to receive video streams from cameras 44 and audio streams from directional microphones 42. Furthermore, as audio stream reception module 60 receives the audio streams, feature computation module 62, threshold evaluation module 64, speech confidence module 66, and subgroup identification module 68 continue using the incoming audio streams to determine whether when it is more likely that the direction of the source of the speech sounds will be correctly identified using the audio streams from a first subgroup of the directional microphones than the audio streams from any other subgroup of the directional microphones and whether it is more likely that the direction of the source of the speech sounds will be correctly identified using the audio streams from the first subgroup of the directional microphones than the audio streams from all of the directional microphones. For example, host device 14 may perform operation 99 on a periodic basis or a continuous basis. In one instance, host device 14 may perform operation 99 to reevaluate whether to use inputs from a subset of the directional microphones or all of the directional microphones once every audio frame.

Because host device 14 continues to perform operation 99 on the incoming audio streams, SSL module 70 may automatically switch from identifying the direction of the speech source using the audio streams from a first subgroup of directional microphones 42 to identifying the direction of the speech source using the audio streams from all of directional microphones 42 when it becomes more likely that the direction of the speech source will be correctly identified using the audio streams from all of directional microphones 42 than the audio streams from any subgroup of directional microphones 42. In addition, SSL module 70 may automatically switch from identifying the direction of the speech source using the audio streams from all of directional microphones 42 to identifying the direction of the speech source using the first subgroup of directional microphones 42 when it becomes more likely that the direction of the speech source will be correctly identified using the audio streams from the first subgroup of directional microphones 42 than the audio streams from any other subgroup of directional microphones 42 and when it is more likely that the direction of the speech source will be correctly identified using the audio streams from the first subgroup of directional microphones 42 than the audio streams from all of directional microphones 42. Likewise, SSL module 70 may automatically switch from identifying the direction of the speech source using the audio streams from the first subgroup of directional microphones 42 to identifying the direction of the speech source using the audio streams from a second subgroup of directional microphones 42 when it becomes more likely that the direction of the speech source will be correctly identified using the audio streams from the second subgroup of directional microphones 42 than the audio streams from any other subgroup of directional microphones 42 and when it is more likely that the direction of the speech source will be correctly identified using the audio streams from the second subgroup of directional microphones 42 than the audio streams from all of directional microphones 42.

It should be appreciated that the operation illustrated in the example of FIG. 4 is only example operation. The techniques of this disclosure may be implemented using many other operations. For instance, other operations may include more or fewer steps or the steps may be arranged in a different order.

Figure 5:
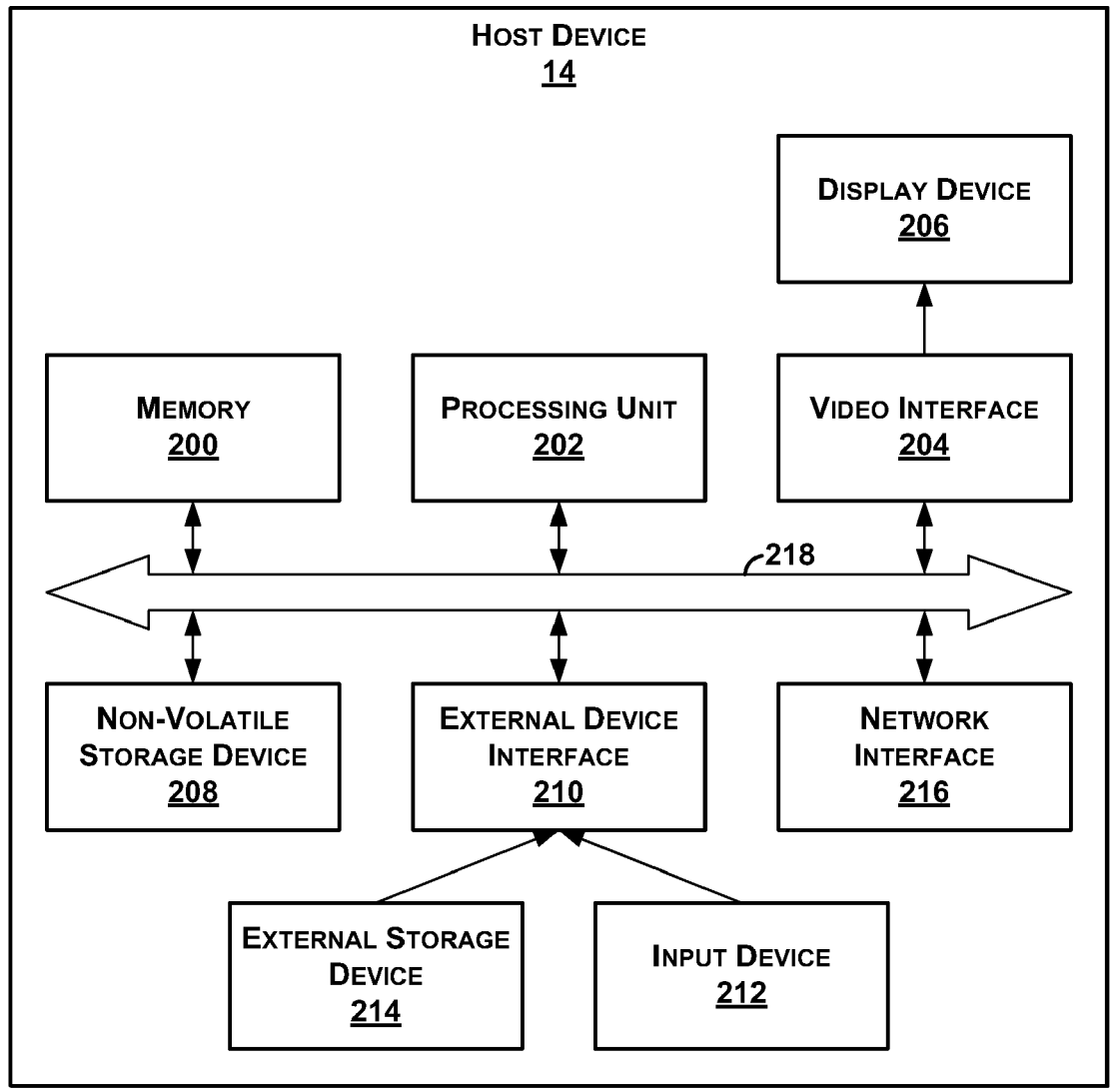
FIG. 5 is a block diagram illustrating example physical components of the host device.

FIG. 5 is a block diagram illustrating example physical components of host device 14. As illustrated in the example of FIG. 5, host device 14 comprises a memory unit 200. Memory unit 200 is a computer-readable storage medium that is capable of storing data and instructions. Memory unit 200 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, host device 14 comprises a processing unit 202. In a first example, processing unit 202 may execute software instructions that cause processing unit to provide specific functionality. In this first example, processing unit 202 may be implemented as one or more processing cores and/or as one or more separate microprocessors. For instance, in this first example, processing unit 202 may be implemented as one or more Intel Core 2 microprocessors. Processing unit 202 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, processing unit 202 may be implemented as an application specific integrated circuit (ASIC) that provides specific functionality. In an third example, processing unit 202 may provide specific functionality by using an ASIC and by executing software instructions.

Host device 14 also comprises a video interface 204 that enables host device 14 to output video information to a display device 206. Display device 206 may be a variety of different types of display devices. For instance, display device 206 may be a cathode-ray tube display, an LCD display panel, a plasma screen display panel, a touch-sensitive display panel, a LED array, or another type of display device.

In addition, host device 14 includes a non-volatile storage device 208. Non-volatile storage device 208 is a computer-readable storage medium that is capable of storing data and/or instructions. Non-volatile storage device 208 may be a variety of different types of different non-volatile storage devices. For example, non-volatile storage device 208 may Blu-Ray disc drives, or other types of non-volatile storage devices.

Host device 14 also includes an external component interface 210 that enables host device 14 to communicate with external components. As illustrated in the example of FIG. 5, external component interface 210 communicates with an input device 212 and an external storage device 214. In one implementation of host device 14, external component interface 210 is a Universal Serial Bus (USB) interface. In other implementations of host device 14, host device 14 may include another type of interface that enables host device 14 to communicate with input device and/or output devices. For instance, host device 14 may include a PS/2 interface. Input device 212 may be a variety of different types of devices including, but not limited to, keyboards, mice, trackballs, stylus input devices, touch pads, touch-sensitive display screens, or other types of input devices. External storage device 214 may be a variety of different types of computer-readable storage media including magnetic tape, flash memory modules, magnetic disk drives, optical disc drives, and other computer-readable storage media.

In addition, host device 14 includes a network interface 216 that enables host device 14 to send data to and receive data from network 18. Network interface 216 may be a variety of different types of network interface. For example, network interface 216 may be an Ethernet interface, a token-ring network interface, a fiber optic network interface, a wireless network interface (e.g., WiFi, WiMax, etc.), or another type of network interface.

Host device 14 also includes a communications medium 218 that facilitates communication among the various components of host device 14. Communications medium 218 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

Several computer-readable storage media are illustrated in the example of FIG. 5 (i.e., memory 200, non-volatile storage device 208, and external storage device 214). Together, these computer-readable storage media may constitute a single logical computer-readable storage medium. This single logical computer-readable storage medium may store instructions executable by processing unit 202. Actions described in the above description may result from the execution of the instructions stored on this single logical computer-readable storage medium. Thus, when this description says that a particular logical module performs a particular action, such a statement may be interpreted to mean that instructions of the software module cause a processing unit, such as processing unit 202, to perform the action.

The techniques of this disclosure may be realized in many ways. For example, the techniques of this disclosure may be realized as a method performed at a computing device to identify a direction of a source of speech sounds relative to an array of directional microphones. The method comprises receiving, at the computing device, a set of audio streams from directional microphones in the array of directional microphones, the array of directional microphones comprising at least two directional microphones. In addition, the method comprises automatically identifying, at the computing device, the direction of the source of the speech sounds using the audio streams from the directional microphones in a first subgroup of the directional microphones when it is more likely that the direction of the source of the speech sounds will be correctly identified using the audio streams from the first subgroup of the directional microphones than the audio streams from any other subgroup of the directional microphones and when it is more likely that the direction of the source of the speech sounds will be correctly identified using the audio streams from the first subgroup of the directional microphones than the audio streams from all of the directional microphones. Furthermore, the method comprises automatically identifying, at the computing device, the direction of the source of the speech sounds using the audio streams from all of the directional microphones when it is more likely that the direction of the source of the speech sounds will be correctly identified using the audio streams from all of the directional microphones than the audio streams from any subgroup of the directional microphones.

In another example, the techniques of this disclosure may be realized as a computing device that comprises an interface that receives a set of audio streams from directional microphones in a circular array of directional microphones located at a local venue. The computing device also comprises a processing unit that automatically identifies a direction of a source of speech sounds relative to the array of directional microphones using the audio streams from the directional microphones in a first subgroup of the directional microphones when it is more likely that the direction of the source of the speech sounds will be correctly identified using the audio streams from the first subgroup of the directional microphones than the audio streams from any other subgroup of the directional microphones and when it is more likely that the direction of the source of the speech sounds will be correctly identified using the audio streams from the first subgroup of the directional microphones than the audio streams from all of the directional microphones. In this example, the computing device also automatically identifies the direction of the source of the speech sounds using the audio streams from all of the directional microphones when it is more likely that the direction of the source of the speech sounds will be correctly identified using the audio streams from all of the directional microphones than the audio streams from any subgroup of the directional microphones.

In another example, the techniques of this disclosure may be realized as a computer-readable storage medium comprising instructions that, when executed by a processing unit, cause the processing unit to receive a set of audio streams from directional microphones in a circular array of directional microphones at a local venue, the array of directional microphones comprising at least six directional microphones, wherein the audio streams include speech sounds and noise. The instructions also cause the processing unit to receive a set of video streams from cameras at the local venue. In addition, the instructions cause the processing unit to automatically calculate, on a periodic basis, a signal-to-noise ratio for each of the directional microphones. Furthermore, the instructions cause the processing unit to automatically identify, on the periodic basis, a minimum signal-to-noise ratio from the signal-to-noise ratios. The instructions also cause the processing unit to automatically determine, on the periodic basis, whether the minimum signal-to-noise ratio is greater than a signal-to-noise ratio threshold. In addition, the instructions cause the processing unit to identify, on the periodic basis, a direction of a source of the speech sounds relative to the array of directional microphones using the audio streams from all directional microphones when it is determined that the minimum signal-to-noise ratio is greater than the signal-to-noise threshold. When it is determined that the minimum signal-to-noise ratio is not greater than the signal-to-noise threshold, the instructions cause the processing unit to automatically compute, on the periodic basis, spectral entropies for each of the directional microphones, automatically calculate, on the periodic basis, speech confidence values for each of the directional microphones using the spectral entropies for the directional microphones and the signal-to-noise ratios for the directional microphones, automatically identify, on the periodic basis, the direction of the source of the speech sounds relative to the array of the directional microphones using the audio streams from the directional microphones in a subgroup of the directional microphones that has directional microphones that have a total of the speech confidence values that is greater than a total of the speech confidence values for the directional microphones in any other of the subgroups of the directional microphones. The instructions also cause the processing unit to automatically, in response to identifying the direction of the source of the speech sounds, cause a display device at a remote venue to display a video stream having an angle of view centered generally in the direction of the source of the speech sounds.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method performed at a computing device to identify a direction of a source of speech sounds relative to an array of directional microphones, the method comprising:
    receiving, at the computing device, a set of audio streams from directional microphones in the array of directional microphones, the array of directional microphones comprising at least two directional microphones;
    automatically identifying, at the computing device, the direction of the source of the speech sounds using the audio streams from the directional microphones in a first subgroup of the directional microphones when it is more likely that the direction of the source of the speech sounds will be correctly identified using the audio streams from the first subgroup of the directional microphones than the audio streams from any other subgroup of the directional microphones and when it is more likely that the direction of the source of the speech sounds will be correctly identified using the audio streams from the first subgroup of the directional microphones than the audio streams from all of the directional microphones; and
    automatically identifying, at the computing device, the direction of the source of the speech sounds using the audio streams from all of the directional microphones when it is more likely that the direction of the source of the speech sounds will be correctly identified using the audio streams from all of the directional microphones than the audio streams from any subgroup of the directional microphones.

2. The method of claim 1, further comprising:
    receiving, at the computing device, a digital representation of an image that was captured after the direction of the source of the speech sounds has been identified, the image having an angle of view that is generally centered in the direction of the source of the speech sounds; and
    in response to identifying the direction of the source of the speech sounds, automatically causing, at the computing device, a display device to display the image.

3. The method of claim 2, wherein automatically causing the display device to display the image comprises transmitting information via an electronic communication network to a remote computing device that uses the information to recreate the digital representation of the image and displays the digital representation of the image on the display device.

4. The method of claim 1, wherein the audio streams include a noise.

5. The method of claim 1, wherein the array of directional microphones is a circular array of directional microphones.

6. The method of claim 5, wherein each of the directional microphones in the first subgroup of the directional microphones are mutually adjacent.

7. The method of claim 1, further comprising:
    automatically calculating, at the computing device, a signal-to-noise ratio for each of the directional microphones;
    automatically identifying, at the computing device, a minimum signal-to-noise ratio from the signal-to-noise ratios;
    automatically determining, at the computing device, whether the minimum signal-to-noise ratio is greater than a signal-to-noise ratio threshold; and
    wherein it is more likely that the direction of the source of the speech sounds will be correctly identified using the audio streams from all of the directional microphones than the audio streams from any subgroup of the directional microphones when the minimum signal-to-noise ratio is greater than the signal-to-noise threshold.

8. The method of claim 7, further comprising:
    automatically calculating, at the computing device, speech confidence values for each of the directional microphones; and
    automatically determining, at the computing device, that it is more likely that the direction of the source of the speech sounds will be correctly identified using the audio streams from the first subgroup of the directional microphones than from the audio streams from any other subgroup of the directional microphones when a total of the speech confidence values for the directional microphones in the first subgroup of directional microphones is greater than a total of the speech confidence values for the directional microphones in any other subgroup of the directional microphones.

9. The method of claim 8, wherein calculating the speech confidence values for each of the directional microphones comprises:
    automatically computing, at the computing device, spectral entropies for each of the directional microphones; and
    for each of the directional microphones, automatically calculating, at the computing device, the speech confidence value for the directional microphone using the spectral entropy for the directional microphone and the signal-to-noise ratio for the directional microphone.

10. The method of claim 1, further comprising:
    automatically switching, at the computing device, from identifying the direction of the source of the speech sounds using the audio streams from the first subgroup of the directional microphones to identifying the direction of the source of the speech sounds using the audio streams from all of the directional microphones when it becomes more likely that the direction of the source of the speech sounds will be correctly identified using the audio streams from all of the directional microphones than the audio streams from any subgroup of the directional microphones;
    automatically switching, at the computing device, from identifying the direction of the source of the speech sounds using the audio streams from all of the directional microphones to identifying the direction of the source of the speech sounds using the first subgroup of the directional microphones when it becomes more likely that the direction of the source of the speech sounds will be correctly identified using the audio streams from the first subgroup of the directional microphones than the audio streams from any other subgroup of the directional microphones and when it is more likely that the direction of the source of the speech sounds will be correctly identified using the audio streams from the first subgroup of the directional microphones than the audio streams from all of the directional microphones; and automatically switching, at the computing device, from identifying the direction of the source of the speech sounds using the audio streams from the first subgroup of the directional microphones to identifying the direction of the source of the speech sounds using the audio streams from a second subgroup of the directional microphones when it becomes more likely that the direction of the source of the speech sounds will be correctly identified using the audio streams from the second subgroup of the directional microphones than the audio streams from any other subgroup of the directional microphones and when it is more likely that the direction of the source of the speech sounds will be correctly identified using the audio streams from the second subgroup of the directional microphones than the audio streams from all of the directional microphones.

11. The method of claim 1,
wherein the method further comprises receiving, at the computing device, a plurality of video streams;
automatically causing, at the computing device, a display device at a remote venue to display a first one of the video streams when the first one of the video streams has an angle of view that is generally centered in the direction of the source of the speech sounds; and
when no one of the video streams has an angle of view that is generally centered in the direction of the source of the speech sounds:
generating, at the computing device, a new video stream that has an angle of view that is generally centered in the direction of the source of the speech sounds by digitally stitching together at least two video streams in the plurality of video streams; and
automatically causing, at the computing device, a display device at a remote venue to display the new video stream.

12. The method of claim 1, wherein automatically identifying the direction of the source of the speech sounds using the audio streams from the directional microphones in the first subgroup of the directional microphones comprises applying a time-delay of arrival technique using the audio streams from the directional microphones in the first subgroup of the directional microphones.

13. A computer readable storage medium comprising instructions that, when executed by a processing unit, cause the processing unit to:

receive a set of audio streams from directional microphones in a circular array of directional microphones at a local venue, the array of directional microphones comprising at least six directional microphones, wherein the audio streams include speech sounds and non-stationary noise;
receive a set of video streams from cameras at the local venue;
automatically calculate, on a periodic basis, a signal-to-noise ratio for each of the directional microphones;
automatically identify, on the periodic basis, a minimum signal-to-noise ratio from the signal-to-noise ratios;
automatically determine, on the periodic basis, whether the minimum signal-to-noise ratio is greater than a signal-to-noise ratio threshold;
identify, on the periodic basis, a direction of a source of the speech sounds relative to the array of directional microphones using the audio streams from all directional microphones when it is determined that the minimum signal-to-noise ratio is greater than the signal-to-noise threshold;
when it is determined that the minimum signal-to-noise ratio is not greater than the signal-to-noise threshold:
automatically compute, on the periodic basis, spectral entropies for each of the directional microphones;
automatically calculate, on the periodic basis, speech confidence values for each of the directional microphones using the spectral entropies for the directional microphones and the signal-to-noise ratios for the directional microphones; and
automatically identify, on the periodic basis, the direction of the source of the speech sounds relative to the array of the directional microphones using the audio streams from the directional microphones in a subgroup of the directional microphones that has directional microphones that have a total of the speech confidence values that is greater than a total of the speech confidence values for the directional microphones in any other of the subgroups of the directional microphones; and
in response to identifying the direction of the source of the speech sounds, automatically cause a display device at a remote venue to display a video stream having an angle of view centered generally in the direction of the source of the speech sounds.

* * * * *